United States Patent
Sagen et al.

(10) Patent No.: US 9,363,858 B2
(45) Date of Patent: Jun. 7, 2016

(54) MULTI-STRING LED DRIVE SYSTEM

(71) Applicant: ANALOG DEVICES, INC., Norwood, MA (US)

(72) Inventors: Eric Sagen, Longmont, CO (US); Jonathan Kraft, Frederick, CO (US); Kenneth G. Richardson, Erie, CO (US)

(73) Assignee: Analog Devices, Inc., Norwood, MA (US)

( * ) Notice: Subject to any disclaimer, the term of this patent is extended or adjusted under 35 U.S.C. 154(b) by 339 days.

(21) Appl. No.: 13/919,371

(22) Filed: Jun. 17, 2013

(65) Prior Publication Data

US 2014/0015427 A1    Jan. 16, 2014

Related U.S. Application Data

(63) Continuation-in-part of application No. 13/742,770, filed on Jan. 16, 2013, now Pat. No. 8,901,853.

(60) Provisional application No. 61/670,458, filed on Jul. 11, 2012.

(51) Int. Cl.
| | |
|---|---|
| *H05B 37/00* | (2006.01) |
| *H05B 39/00* | (2006.01) |

(Continued)

(52) U.S. Cl.
CPC .......... *H05B 33/083* (2013.01); *H05B 33/0815* (2013.01); *H05B 33/0827* (2013.01); *Y02B 20/347* (2013.01)

(58) Field of Classification Search
CPC ...................................................... H05B 33/083
USPC ............................................ 315/185 R, 186
See application file for complete search history.

(56) References Cited

U.S. PATENT DOCUMENTS

| | | |
|---|---|---|
| 8,169,161 B2 | 5/2012 | Szczeszynski et al. |
| 8,384,311 B2 | 2/2013 | Gray et al. |

(Continued)

FOREIGN PATENT DOCUMENTS

JP    2008311602 A    *    12/2008

OTHER PUBLICATIONS

"U.S. Appl. No. 13/742,770, Non Final Office Action mailed Jun. 16, 2014", 7 pgs.

(Continued)

*Primary Examiner* — Sibin Chen
*Assistant Examiner* — Metasebia Retebo
(74) *Attorney, Agent, or Firm* — Schwegman Lundberg & Woessner, P.A.

(57) ABSTRACT

A drive system for multiple LED strings powered by a common line voltage. Current control circuits are connected in series with respective LED strings; each current control circuit includes a drive transistor (typically a FET) which causes a desired LED string current to be conducted. In one embodiment, the current conducted by a selected one of the LED strings is controlled by the line voltage regulation loop, while the currents conducted by the remaining LED strings are controlled by respective local current loops, thus avoiding conflicts between the local current and line voltage regulation loops. The LED string to be current regulated by the line voltage regulation loop can be determined by a variety of criteria, such as the current control circuit having the maximum FET gate voltage, the minimum FET source voltage, the minimum FET drain voltage, the maximum FET gate-source voltage, or the minimum FET drain-source voltage.

18 Claims, 10 Drawing Sheets

(51) Int. Cl.
*H05B 41/00* (2006.01)
*H05B 33/08* (2006.01)

(56) References Cited

U.S. PATENT DOCUMENTS

| | | | |
|---|---|---|---|
| 8,525,433 B2 | 9/2013 | Lee et al. | |
| 8,536,806 B2 | 9/2013 | Kitagawa et al. | |
| 8,901,853 B2 | 12/2014 | Kraft | |
| 2009/0128045 A1* | 5/2009 | Szczeszynski | H05B 33/0815 315/185 R |
| 2009/0302776 A1* | 12/2009 | Szczeszynski | H05B 33/0815 315/246 |
| 2014/0015424 A1 | 1/2014 | Kraft | |

OTHER PUBLICATIONS

"U.S. Appl. No. 13/742,770, Non Final Office Action mailed Dec. 23, 2013", 6 pgs.

"U.S. Appl. No. 13/742,770, Notice of Allowance mailed Aug. 5, 2014", 7 pgs.

"U.S. Appl. No. 13/742,770, Response filed Mar. 19, 2014 to Non Final Office Action mailed Dec. 23, 2013", 9 pgs.

"U.S. Appl. No. 13/742,770, Response filed Jul. 16, 2014 to Non Final Office Action mailed Jun. 16, 2014", 7 pgs.

* cited by examiner

MULTI-STRING LED DRIVE SYSTEM

RELATED APPLICATIONS

This application is a continuation-in-part of application Ser. No. 13/742,770, filed Jan. 16, 2013, which claimed the benefit of provisional patent application No. 61/670,458 to Kraft et al., filed Jul. 11, 2012.

BACKGROUND OF THE INVENTION

1. Field of the Invention

This invention relates generally to series/parallel LED drive systems, and more particularly to techniques designed to optimize the power efficiency of such systems.

2. Description of the Related Art

LED lighting strategies may employ LEDs driven in series, parallel, or both. LEDs driven in series by definition all share the same current. If all LEDs share the same current, ideally the brightness of the LEDs will be matched. A number of applications require a number of LEDs to be driven with matched brightness, and so connecting the LEDs in series—thereby forming a LED 'string'—accomplishes the task. A problem can arise, however, if a very large number of LEDs must be driven in series. The series-connected LEDs are powered by a line voltage necessary to provide the necessary current; however, finding line regulators able to support the large line voltage needed for a high LED count series string may be difficult or cost prohibitive.

LEDs may also be arranged in parallel, where each independent LED is driven by a current source or (most commonly) a current sink circuit. But brightness matching between the parallel-connected LEDs is limited by the imperfect matching of the drive circuits, which can vary widely depending on the choice of sink circuit implementation. Another problem with a parallel configuration is that if a large number of LEDs need to be driven the large number of sink circuits required may be cost prohibitive. A parallel LED configuration does have the advantage of typically requiring a lower line voltage than does a series configuration, which may be a benefit in some applications. Also, in some applications LEDs are connected in parallel because different currents need to be driven through the LEDs.

Due to the issues noted above, the best approach may be a compromise between the series and parallel solutions: a "series/parallel" solution. Note that a series/parallel solution could in principle be implemented by simply taking the series approach discussed above and creating multiple copies of this solution. However, this cut and paste approach adds cost to the overall solution because of the need for separate line regulators for each string (or "channel"). In some cases a single integrated circuit (IC) with multiple regulator channels may be able to take the place of multiple regulators, but for a number of solutions an appropriate multiple output regulator may not exist or may still be cost prohibitive due to the number of non-regulator external components required (e.g., capacitors, inductors, resistors).

A cost effective compromise employing a series/parallel solution is shown in FIG. 1. Here, each series LED string 10, 12, 14 has its own independent current sink, but at the same time all series strings share a common line voltage $V_{line}$ driven from a single line regulator 16. The conventional solution for choosing an appropriate line voltage value recognizes that the LED sink devices (NMOS FETs M0, M1 and M2 in FIG. 1, but other device types might also be used) act best as current sinks when all the devices operate in their active region. An NMOS FET will operate in its active region so long as its drain-source voltage ($V_{ds}$) is sufficiently large. Thus, for a series/parallel LED solution such as that shown in FIG. 1, insuring that each sink device operates in active mode amounts to choosing a sufficiently large line voltage.

In order to maximize the power efficiency of a series/parallel LED solution such as that shown in FIG. 1, one would ideally like to choose the line voltage—here set by a voltage divider 18—such that all sink NMOS devices operate with just enough drain-source voltage to operate in active mode. Some power must be dissipated in the current sinks in order to achieve the desired LED drive currents, but ultimately any power dissipated in the sinks above the power required by the LEDs represents efficiency loss. To minimize the efficiency loss from current sink dissipation, the drain-source voltage of the sink devices should be designed to be as small as possible. That is, the power $P_{sink}$ dissipated in each current sink, given by $P_{sink}=I_{sink}*V_{ds}$ where $I_{sink}$ and $V_{ds}$ are the current conducted by and the drain-source voltage across the sink device, respectively, should be as small as possible.

Ideally, the line voltage is set sufficient to guarantee nominal active operation for the NMOS sink devices, but also large enough to account for variations in the components (such as between the drain-source voltages needed for active operation of the sink devices and between the forward voltage drops of the LEDs). One technique used to dynamically account for the variation in the LED forward voltage drops utilizes a "minimum" circuit; this approach is illustrated in FIG. 2. The minimum circuit 20 receives the drain voltage of each of the NMOS current sinks and outputs the minimum drain voltage of the group. A line control amplifier 22 receives the minimum voltage and a reference voltage $V_{ref-drain}$ at respective inputs, and provides an output to the feedback input of line regulator 16 such that the LED channel with the minimum drain voltage operates at a desired target voltage equal to $V_{ref-drain}$. The drain reference voltage is typically chosen to be just large enough to guarantee that the sink device operates in its active region. Because all LED strings share a common line voltage, it can be inferred that the channel with the minimum drain voltage possesses the largest voltage drop across its string of LEDs. Therefore, once the system regulates the minimum drain voltage to the target voltage, it can be inferred that the remaining non-minimum channels have sink devices operating in their active regions because the voltage drop across the LED strings in each of those channels is known to be smaller than the voltage drop of the LED string of the minimum channel.

The minimum circuit solution of FIG. 2 works well in cases where the sink devices are well-matched (i.e., the devices require the same minimum $V_{ds}$ to be in the active region). In a practical situation, to ensure the sink devices are guaranteed to be in the active region, $V_{ref-drain}$ needs to be large enough to account for any variation (in the minimum required $V_{ds}$ for active region operation) between the sink devices over manufacturing process and temperature. Since $V_{ref-drain}$ must be set higher than otherwise might be the case if the sink devices were well-matched, some accompanying power efficiency loss can result. To improve the power efficiency of the system in FIG. 2, $V_{ref-drain}$ could be lowered below the point where the sink devices operate in active, so that they instead operate in their linear regions (also referred to herein as operating in the "triode region" or simply "in triode"). The first problem that arises with this strategy is that any sink device operating in triode will now have its current strongly dependent upon both its gate-source voltage and its drain-source voltage; although, practically speaking, even in active mode, the sink device currents are weakly dependent upon drain-source voltage. For any sink operation case, a local closed loop control system around each sink device eliminates or at least reduces this dependence, and can help ensure that the current through the device regulates to the desired value. One example of a popular local closed loop topology is shown in FIG. 3 (which depicts only the LED string 10 portion of FIG. 2). Here, sink device M0 is connected in series with a resistance R0 at a junction 30, and a "local current loop amplifier" 32 drives sink device M0 with a voltage $V_{g0}$ as needed to make the voltage at junction 30 equal to a reference voltage $V_{ref}$ such that LED string 10 conducts a desired current given by $V_{ref}/R0$. One advantage of the topology in FIG. 3 is the use of a resistance (R0) to set the current through the sink device and LED string, as resistors generally match well in IC designs (or well-matched resistors for discrete designs can be purchased with reasonable cost) and thus help provide for good sink-to-sink current matching.

SUMMARY OF THE INVENTION

A multi-string LED drive system is presented which addresses the problems discussed above, with system power efficiency being optimized in cases of imbalance between LED string voltage drops as well as sink device characteristics.

The present LED drive system is for controlling the currents conducted by two or more LED strings which are powered by a common line voltage. One possible embodiment of the system includes:
  a plurality of current control circuits connected in series with respective LED strings, each of which includes a transistor arranged to cause a desired LED string current to be conducted when a sufficient voltage is applied to the transistor's control terminal (gate, assuming that the transistor is a FET);
  a "maximum" circuit which receives the voltages on each of the FET gates at respective inputs and which outputs a voltage which is proportional to the greatest of the received gate voltages; and
  a line voltage regulator circuit configured to operate as a line voltage regulation loop, which receives the output of the maximum circuit and a signal which represents a target gate voltage at respective inputs and which generates the common line voltage such that the highest of the gate voltages is approximately equal to the target gate voltage.

The LED drive system is preferably arranged such that the target gate voltage is sufficient to operate each MOSFET in its triode region. Each current control circuit preferably includes a local current loop amplifier which uses a resistor to set the LED drive current.

Further embodiments of the present system enable the LED string current conducted by a selected one of the current control circuits to be controlled by the line voltage regulator circuit, while the LED string currents conducted by the remaining current control circuits are controlled by respective local current loops. This approach serves to avoid conflicts between the local current loops and the line voltage regulation loop. The current control circuit to be selected can be determined by a variety of criteria. For example, the gate voltages of the FETs connected in series with the LED strings can be compared, with the current control circuit having the maximum gate voltage being selected. Other possible criteria include identifying the current control circuit with the minimum FET drain voltage, the maximum FET gate-source voltage, or the minimum FET drain-source voltage.

These and other features, aspects, and advantages of the present invention will become better understood with reference to the following description and claims.

DETAILED DESCRIPTION OF THE INVENTION

As discussed above, to improve the power efficiency of a multi-string LED drive system, each string's current sink device—typically an NMOS FET—can be made to operate in its triode region. However, regardless of the current loop topology chosen, problems still arise when attempting to run a current sink device in triode. With a system employing a "minimum drain voltage" system such as that shown in FIG. 2 with local current regulation loops such as those shown in FIG. 3, if the common line voltage is chosen such that the sink devices run in triode, the control system for the line regulator and the current loop amplifier of the channel with the minimum drain voltage may come into conflict. Running the minimum drain sink device into triode insures that the current through this device depends strongly on both its drain-source and gate-source voltages. Ultimately the gate voltage is adjusted by the current regulation loop, and the drain voltage is for the most part adjusted by the line regulator. Two rival systems now ultimately affect the current through the minimum drain sink device and accompanying LED string; this makes the overall system difficult to design because the conflicting control systems create overlapping loops.

Figure 3:
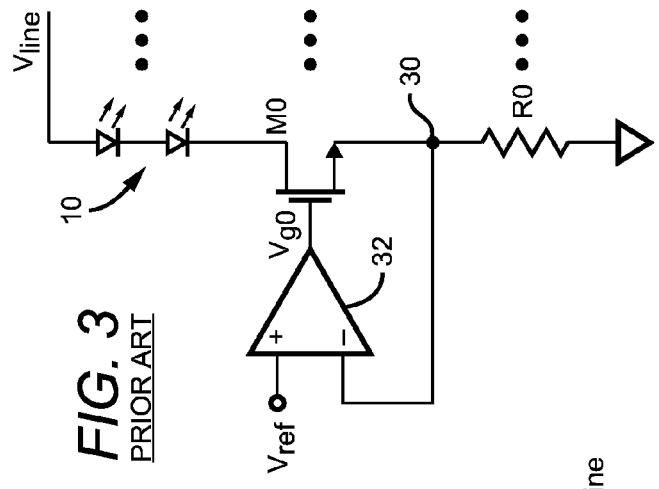
FIG. 3 is a schematic diagram of a known local current loop topology that might be used with an LED drive system such as that shown in FIG. 2.

Another issue with a "minimum drain voltage" system, with local current control loops as shown in FIG. 3 and with the sink devices operating in triode, is choosing a minimum drain reference ($V_{ref\_drain}$) voltage in view of the inherent limitation on the maximum gate voltage that can be provided by the local current loop amplifiers. For the channel that operates with the minimum drain voltage, lowering $V_{ref\_drain}$ requires that the sink device's gate voltage be increased in order to maintain the desired level of current regulation through the string. But if the required gate voltage exceeds the maximum deliverable output voltage of the local current loop amplifier (typically dictated by the power supply rail of the amplifier), the system will not be able to deliver the desired current through the minimum drain LED string. Ideally, the drain voltage target will be limited to insure that over all possible device conditions, the device gate voltage for the minimum channel will not be too close to the amplifier's maximum deliverable output voltage.

Thus, there are several limitations related to a minimum drain voltage solution as discussed above. When operating the sink devices in triode, the chosen minimum drain voltage must be limited in order to insure that the required gate voltages do not exceed the maximum gate drive capability of the local current loop amplifiers. Also, while a minimum drain voltage system automatically adjusts for mismatches in voltage drops across different LED strings, it does not automatically adjust for mismatches between sink devices. And as previously noted, the line voltage regulator loop of the system may conflict with the local current loop for the channel with the minimum drain voltage.

Figure 4:
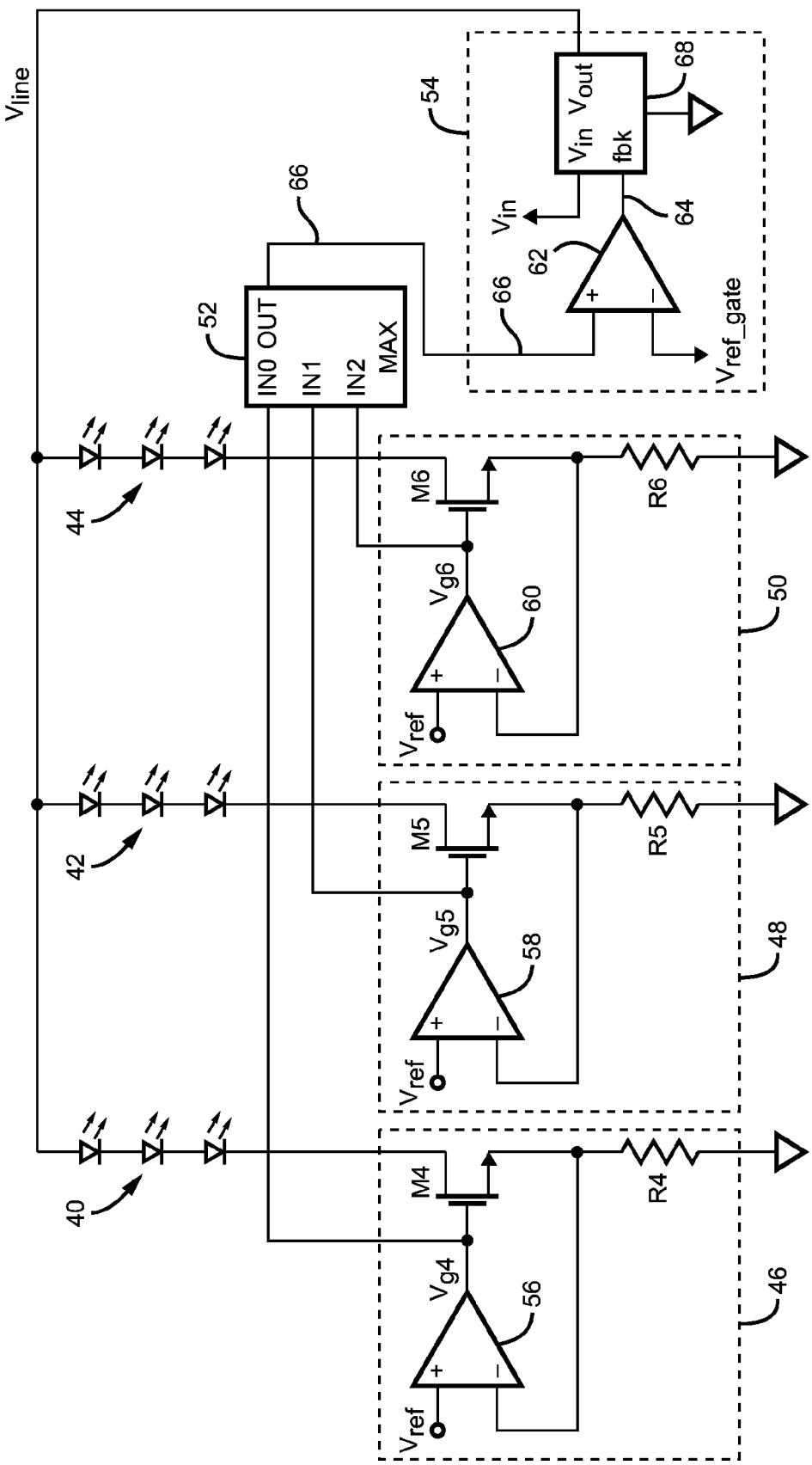
FIG. 4 is a schematic diagram of one possible embodiment of a multi-string LED drive system in accordance with the present invention.

The present multi-string LED drive system addresses many of the problems discussed above; one possible embodiment is shown in FIG. 4. The system controls the current conducted by two or more LED strings 40, 42, 44 which are powered by a common line voltage $V_{line}$; one or more of the LED strings may include one or more LEDs connected in series. The system includes a plurality of current control circuits 46, 48, 50 connected in series with respective LED strings, with each of the current control circuits including a transistor M4, M5, M6 arranged to cause a desired LED string current to be conducted when a sufficient voltage is applied to the transistor's control input (the base terminal if a BJT, but preferably the gate terminal of a MOSFET as shown in FIG. 4). Instead of a "minimum circuit" as discussed above, the present system employs a "maximum circuit" 52 which receives the voltages on the gates of MOSFETs M4, M5 and M6 at respective inputs, and which outputs a voltage which is proportional to (preferably equal to) the greatest of the received gate voltages. A line voltage regulator circuit 54 receives the output of the maximum circuit and a signal which represents a target gate voltage at respective inputs, and generates common line voltage $V_{line}$ such that the highest of the gate voltages ($V_{g4}$, $V_{g5}$, $V_{g6}$) is approximately equal to the target gate voltage.

Current control circuits 46, 48, 50 are preferably local current loops, each of which includes a resistance (R4, R5, R6) connected between each channel's sink device (M4, M5, M6, respectively) and a circuit common point. Each current control circuit also includes an amplifier (56, 58, 60) which receives a reference voltage ($V_{ref}$) at a first input and the voltage at the junction of the resistance and the sink device at a second input and which is arranged to provide a voltage ($V_{g4}$, $V_{g5}$, $V_{g6}$) to the MOSFET's gate needed to force the voltage at the junction to be approximately equal to $V_{ref}$. In this way, the values of $V_{ref}$ and R4, R5 and R6 determine the current conducted by each LED string.

Line voltage regulator circuit 54 preferably includes an error amplifier 62 which provides an output 64 that varies with the difference between the output 66 of maximum circuit 52 and a voltage $V_{ref\_gate}$ which represents a target gate voltage. Amplifier output 64 is provided to a control input of a voltage regulator 68 (labeled 'fbk' herein), which in turn adjusts common line voltage $V_{line}$ until the output of maximum circuit 52 equals $V_{ref\_gate}$ (the highest of the gate voltages ($V_{g4}$, $V_{g5}$, $V_{g6}$) is approximately equal to the target gate voltage). It is well-understood that in practice, error amplifier 62 is likely to include additional components which provide, for example, frequency compensation, optical coupling, etc.

The output of maximum circuit 52 preferably runs in continuous time. Amplifiers 56, 58, 60 have an associated maximum output voltage at which they can operate in steady state, which is typically determined by each amplifier's respective rail (power supply) voltage. The target gate voltage is preferably selected to be approximately equal to (typically just below) this maximum output voltage, which is alternatively referred to herein as the "near-rail limit". For most practical sink devices, having the gate voltage at or near the maximum voltage limit of local current loop amplifiers 56, 58, 60 will collapse the sink devices into deep triode. As a result, the drain-source voltages across the sink devices will be small, thereby reducing waste power dissipation.

The present system optimizes system power efficiency in cases of imbalance between LED string voltage drops, as well as mismatch between sink device characteristics. Consider for the first case a situation where all sink devices are identically matched, but one LED string drops more voltage than the others. The LED string with the greater voltage drop will force its sink device to have a lower drain-source voltage than the other sink devices. In order for the local current loop amplifier to get the sink device to conduct the desired LED string current through the string with the largest drop, the current loop amplifier will increase the gate voltage of the respective sink device. The gate voltage required for this sink device will be larger than the gate voltages needed for the other sink devices, since the drain-source voltages for the remaining sink devices must be larger due to the lesser voltage drops across the remaining LED strings. Maximum circuit 52 will lock on to the larger gate voltage, which causes line voltage regulator circuit 54 to adjust $V_{line}$ to the point where the local current loop of the LED channel with the maximum gate voltage (the "maximum channel") adjusts the gate voltage to the desired target ($V_{ref\_gate}$). At this point, the maximum channel has been driven to have the drain-source voltage of its sink device as small as possible. The drain-source voltage for the sink device of this channel cannot be driven any lower by line voltage regulator circuit 54, since that in turn would require the gate of the sink device to have a voltage above that which can be continuously supplied by the local current loop amplifier. Instead, the system is targeted to where the gate voltage of the maximum channel sink device is as large as practically possible. The remaining channels have larger drain-source voltages across their sink devices owing to their lesser LED string voltage drops, but $V_{line}$ cannot be driven any lower because the maximum channel would once again require a sink device gate voltage above the near-rail limit. Thus, at this point, the system is operating at or near the maximum possible power efficiency.

For the case where the sink devices are mismatched, consider a scenario where now the voltage drops across all of the LED voltage strings are identical. Further assume that all the sink devices are identical except for one which is slightly weaker, due to, for example, a larger device threshold voltage or a slightly reduced mobility. For a given value of $V_{line}$, since all LED strings have the same voltage drop, the drain-source voltages of all sink devices are initially equal. In order to conduct the same current as do the matched sink devices, the weakest sink device must be driven to a larger gate voltage.

Maximum circuit 52 locks onto this larger gate voltage, and causes line regulation circuit 54 to adjust $V_{line}$ until the local current loop of the weakest sink device puts the gate voltage at the desired near-rail limit. At this newly-adjusted $V_{line}$ voltage, all the identical sink devices still have the same drain-source voltage across them, since the voltage drops across all the LED strings are the same. The weakest sink device is now driven with the near-rail limit gate voltage, and since the remaining sink devices have stronger characteristics they are supplied with lower gate voltages from their local current loops in order to regulate the same current. The drain-source voltages of the sink devices cannot be reduced any further by lowering $V_{line}$ since, in order to maintain the string currents, the channel with the weak sink device would be forced to provide a gate voltage that exceeds the near-rail limit. Thus, by definition, the system is once again in its maximum power efficiency state. The present system achieves this result even in cases where imbalances exist in the sink device characteristics and the LED string voltage drops simultaneously.

Thus, this control scheme always adapts to whatever $V_{ds}$ values are necessary to provide accurate current regulation at the minimum power dissipation. The LED strings which do not have the highest gate voltage still operate satisfactorily, though with slightly higher drain-source voltages, with the independent local current loops ensuring accurate current regulation.

As a practical matter the target maximum gate regulation voltage ($V_{ref\_gate}$) is not set at the absolute local current loop amplifier maximum, but slightly lower (the 'near-rail limit') so that the local amplifier does not exhibit any sort of rail-limited collapse when the system operates in steady state. Also, by forcing the maximum sink device gate to a slightly lower target voltage (the 'near rail limit'), the remaining channels may potentially obtain sink device gate voltages that are slightly larger, which is necessary for the maximum circuit to function properly. If the target gate voltage was set equal to the rail-limited voltage output of a current loop amplifier, then a situation can arise where all sink device gates drive to the rail maximum (i.e., the maximum capable drive output of the amplifiers), the line regulator voltage is too low, and the maximum circuit cannot drive the line regulator any higher because all sink device gate voltages are equal. In this scenario the currents through each independent LED string would likely be below intended value.

When arranged as described herein, the present system ensures that one sink device will always be driven to the near-rail limit voltage, which in turn ensures that the drain-source voltage of the same sink device is as small as possible. The present system does not suffer from the problem inherent in a minimum drain voltage system (such as that shown in FIG. 2) of having to pre-choose the drain-source voltage. Instead, the present system automatically chooses the optimal drain-source voltage during operation.

Figure 1:
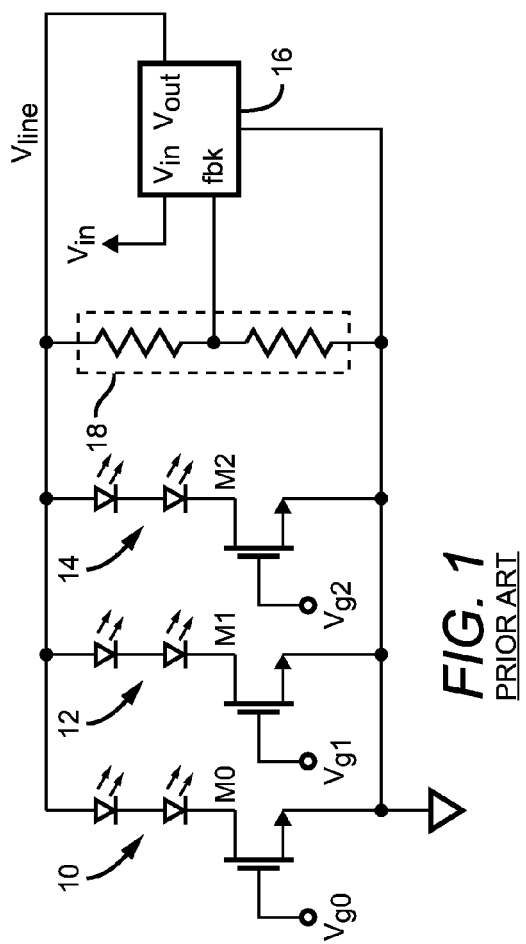
FIG. 1 is a schematic diagram of a known LED drive system.
Figure 2:
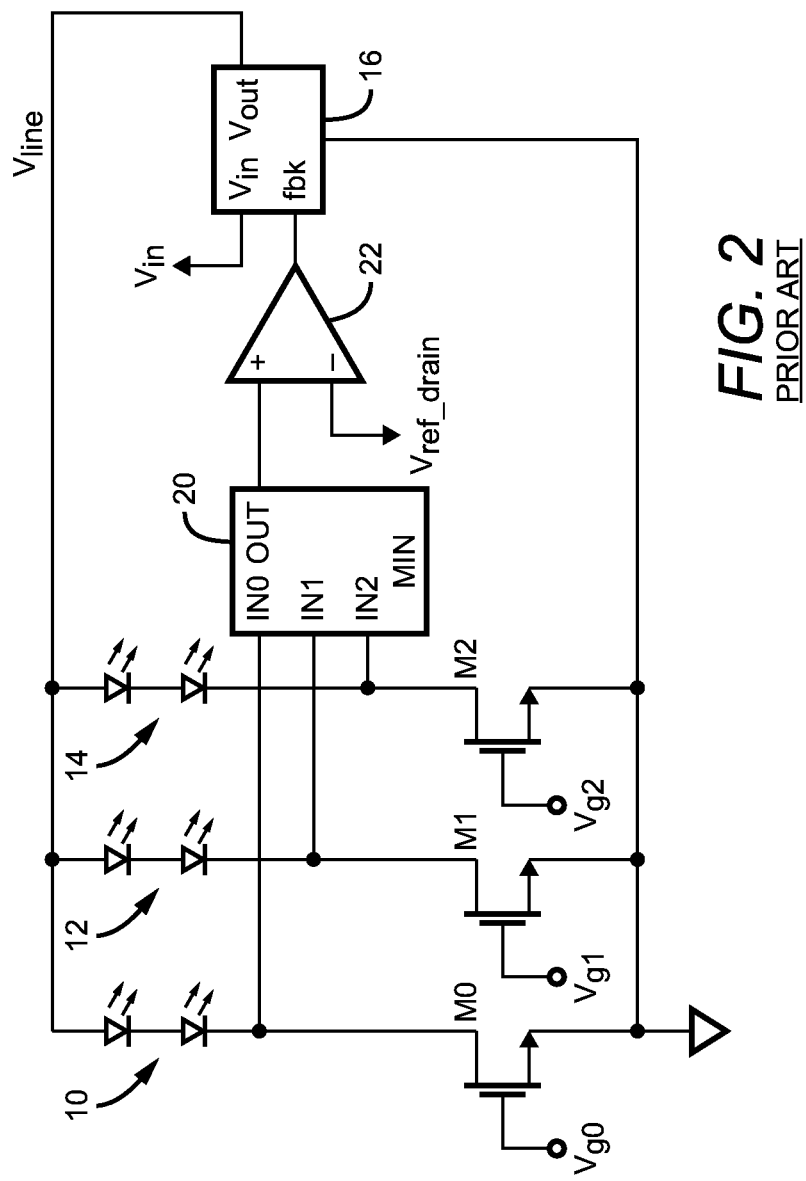
FIG. 2 is a schematic diagram of a known LED drive system which uses a "minimum drain voltage" control scheme.

Line voltage regulation circuit 54 could be implemented in many different ways and with many different regulator chips, as long as the regulator is arranged to vary its output voltage in response to the voltage applied to an input pin such as the 'fbk' pin shown in FIGS. 1, 2 and 4. Numerous voltage regulator ICs can be obtained that provide this functionality. Typically, these ICs require only a few external resistors, inductors, and/or capacitors for a fully functioning regulator design. ICs also exist that provide only the control system and reference, with the power stage to be assembled by the user.

It should be noted that stabilizing the line voltage regulator circuit arrangement as shown in FIGS. 2 and 4 in can be difficult, because the transfer functions of the local current loops and of the line regulation circuit may appear as intermingled terms in each other's respective loop gains.

Figure 5:
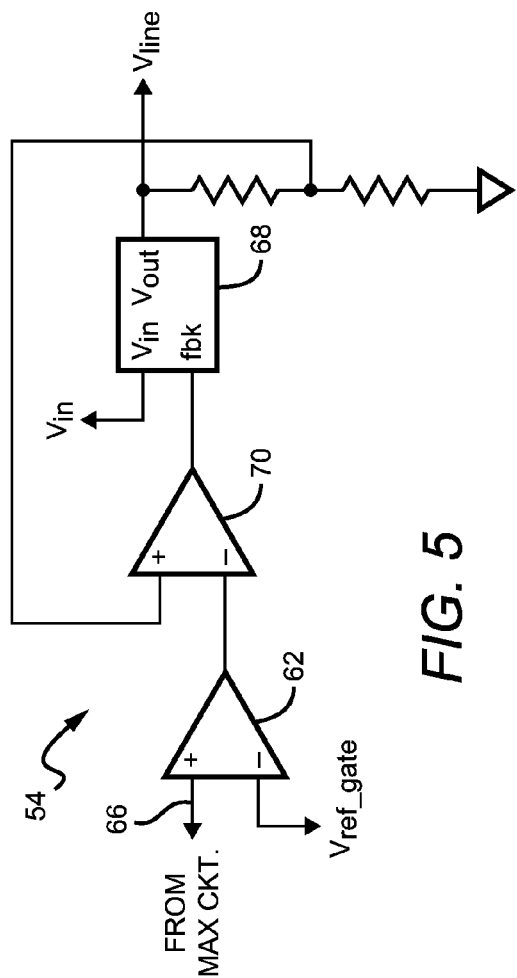
FIG. 5 is a schematic diagram of one possible embodiment of a line voltage regulator circuit as might be used with the present LED drive system.

The circuit shown in FIG. 5 can be useful if the basic arrangement is problematic. Here, an additional amplifier 70 is used to close the loop locally around voltage regulator IC 68, which serves to flatten some of the gain terms associated with the voltage regulator from the point of view of the greater voltage regulation loop. The use of a local loop around the voltage regulator has the added benefit of also allowing the voltage regulator to more quickly respond to external stimuli on the regulator output, as opposed to waiting for the stimuli to be corrected for by the greater voltage regulation loop.

Figure 6:
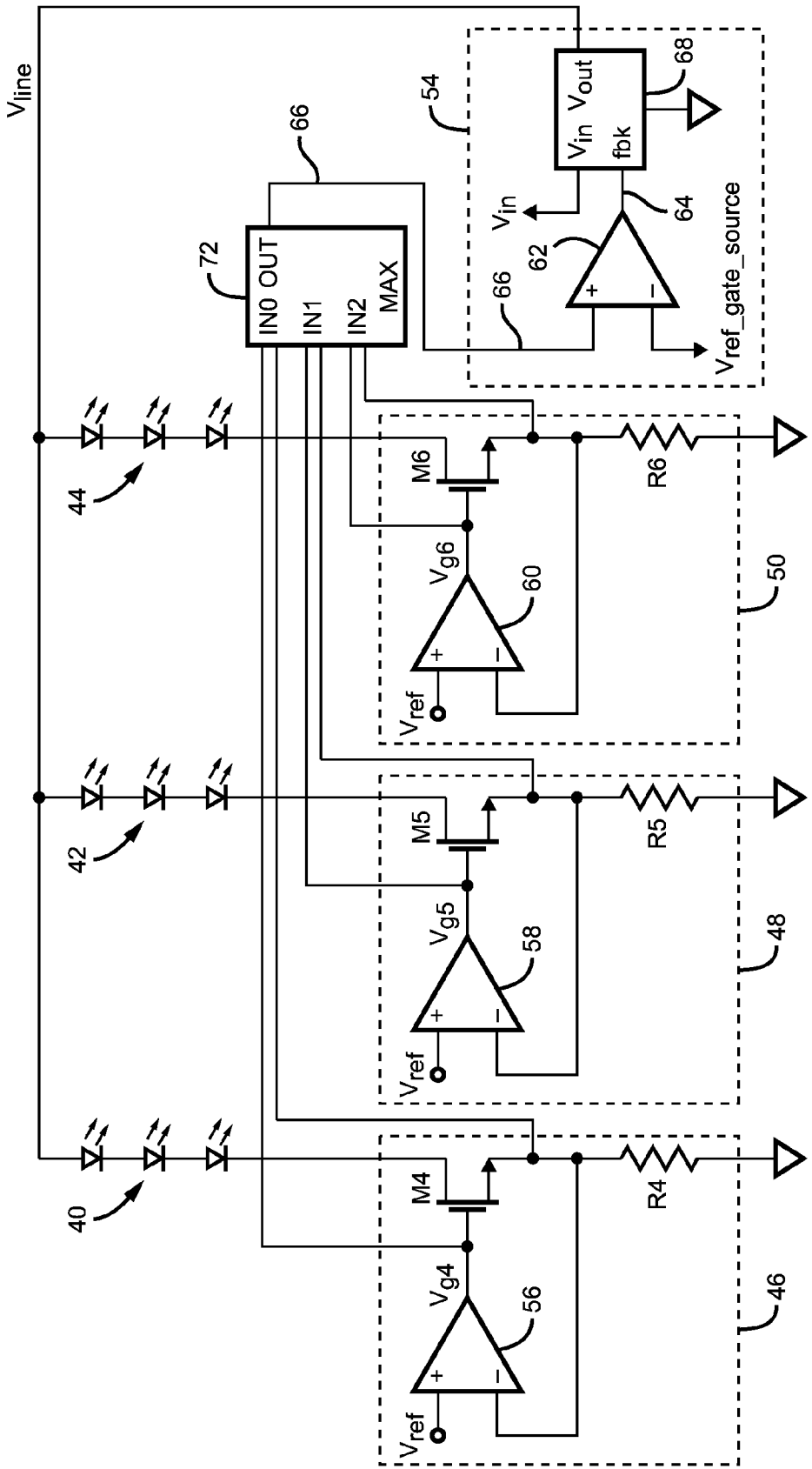
FIG. 6 is a schematic diagram of another possible embodiment of a multi-string LED drive system in accordance with the present invention.

One possible alternative embodiment is shown in FIG. 6. Here, instead of using a maximum circuit to determine the channel having the maximum gate voltage, a maximum circuit 72 determines the channel with the maximum gate-source voltage. Correspondingly, a target gate-source voltage $V_{ref\_gate\_source}$ is provided to error amplifier 62. This approach may be preferred as it accounts for any differences between the source voltages, as well between the gate voltages. The use of this criterion becomes essential if one chooses to use different local current loop source reference voltages for the individual current loops. The maximum gate-source voltage criterion illustrated in FIG. 6 produces optimum efficiency under the widest variety of conditions.

Though the system described above mitigates or eliminates many of the problems known in the prior art, it may still be susceptible to instability due to conflicts between the line voltage regulator loop (formed by maximum circuit 52, line regulation circuit 54, and the LED string and FET of the current control circuit with the maximum gate voltage) and the local current loops. Problems arising from conflicts between loops may be addressed with complex circuit topologies and/or significant performance restrictions on the design of the loops. A less complex and better performing solution to this 'loop entanglement' problem is now described.

Figure 7:
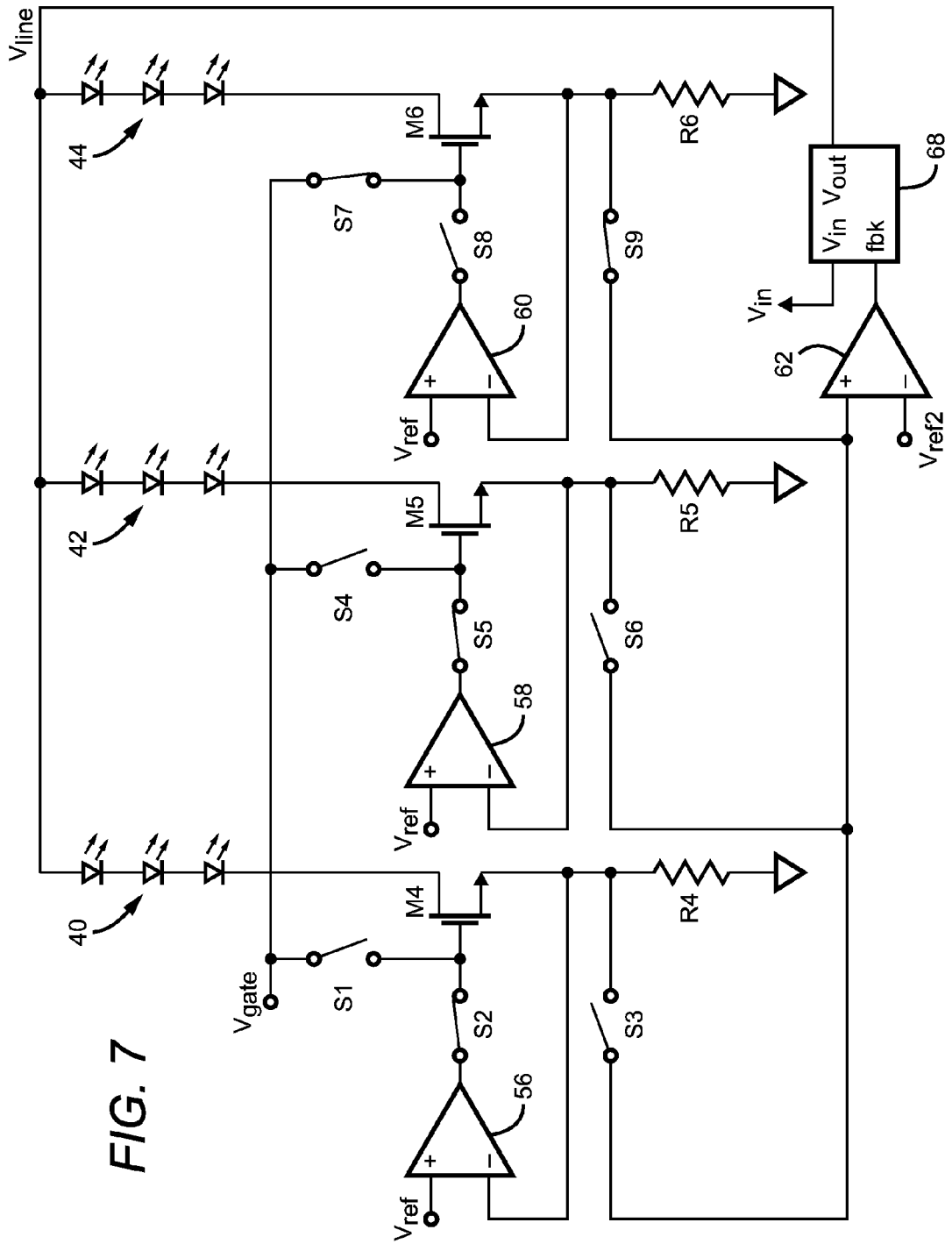
FIG. 7 is a schematic diagram of another possible embodiment of a multi-string LED drive system in accordance with the present invention.

A circuit configuration which illustrates the solution is shown in FIG. 7. Here, switches S1-S9 have been added to a system with three current control circuits. The switches operate in response to respective control signals (not shown). The switches are utilized in such a way that one channel opens a switch to disconnect its local current loop amplifier, closes a switch to connect the gate of the same channel's sink device (M4, M5 or M6) to a fixed voltage $V_{gate}$, and closes a switch connected to the source of the channel's sink device source, such that the current through that channel is determined by the line voltage regulation loop. The remaining channels have their switches configured so that their local current loops control their currents. For example, in FIG. 7, for the channel connected to LED string 40, switches S1 and S3 are open and switch S2 is closed, such that the current in the LED string is controlled by the channel's local current loop. The same arrangement is in place for the channel connected to LED string 42, with switches S4 and S6 open and switch S5 closed.

In the FIG. 7 example configuration for the channel connected to LED string 44, switch S7 is closed and switch S8 is open, connecting the gate of sink device M6 to $V_{gate}$, and switch S9 is closed. When so arranged, the line voltage regulation loop (elements 62 and 68) operates to adjust $V_{line}$ so that the voltage at the source of M6 is equal to a target voltage ($V_{ref2}$; preferably $V_{ref2}=V_{ref}$) provided to error amplifier 62, thereby controlling the current in LED string 44. Since only one channel is allowed to affect the line voltage regulation loop, and the other channels operate locally and independently of the line voltage regulation loop, there can be no conflicts between the loops. The switches can be reconfigured such that any one of the channels can utilize the line voltage regulation loop for current regulation, while the remaining channels are locally regulated.

Figure 8:
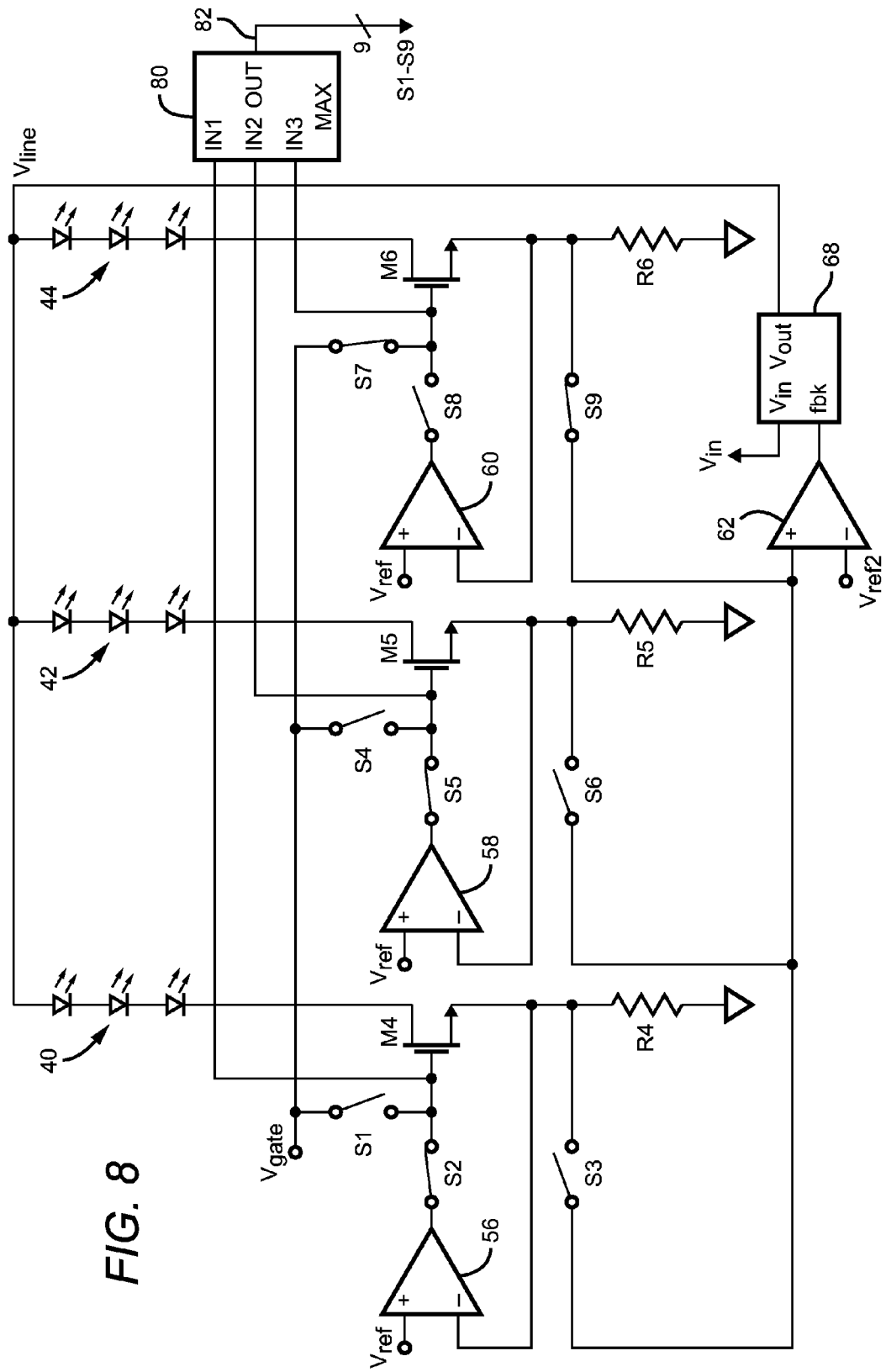
FIG. 8 is a schematic diagram of another possible embodiment of a multi-string LED drive system in accordance with the present invention.

One way of determining which channel should be selected to be part of the line regulation loop is to add decision circuitry which makes the determination based on pre-determined criteria. A preferred decision circuit is a "maximum circuit" connected to ascertain the channel with the maximum gate voltage, as was described above and illustrated in FIG. 4. This is illustrated in FIG. 8. A maximum circuit 80 is connected to the gates of M4, M5 and M6 at respective inputs, and produces outputs 82 which control the states of switches S1-S9. The system is arranged such that the gates of sink devices M4-M6 are periodically inspected to see which gate has the maximum voltage. If the channel using the line voltage regulator loop to set its own current is the channel with the maximum gate voltage, then no further action is taken. However, if one of the other channels is the channel with the maximum sink device gate voltage, then the system reconfigures switches S1-S9 such that the channel with the maximum gate voltage becomes the channel to use the line voltage regulator loop to set its current, and the other channels become current-regulated via their own local current loops. If several gate voltages are equal and a unique determination of a maximum cannot be made, the system is preferably arranged to choose which channel is to use the line voltage regulator loop to set its own current based on a predetermined order. Typically, this order may be as simple as using preassigned channel numbers for the channels with the same gate voltage and cycling through these channel numbers from smallest to greatest—as long as the maximum circuit continues to identify multiple candidates for maximum gate voltage.

The period between maximum gate detection and switch channel reconfiguration is preferably long relative to the time constants associated with the bandwidths of the loops, in order to allow the system to settle to a stable state before the next reconfiguring of the switches. Since the line voltage regulation loop and the local current loops function independently, each loop can generally be designed with greater bandwidth than if the loops were comingled. The greater bandwidths of the loops enables the system to more quickly settle into a stable steady state when reconfigured than if the loops were intermingled. The greater bandwidths of the loops also ensure that the system can readily respond to transients supplied from external stimuli.

After several switch reconfigurations, the system will eventually converge to the point where the channel that uses the line voltage regulation loop to set its channel current will be the channel with the maximum gate voltage. FIG. 8 can be taken as an example showing that the system has converged such that the channel connected to LED string 44 has its switch S8 open and switches S7 and S9 closed and is thus using the line voltage regulation loop to set its channel current; this channel also has the highest gate voltage. Once this has occurred, the system has automatically converged to the point of maximum power efficiency. Moreover, by using the same maximum gate criteria as the system previously described in FIG. 4, the system will automatically account for variation in the voltage drops between different LED strings, as well as variation in the characteristics of the sink channel devices.

As a practical matter, the fixed voltage $V_{gate}$ connected to a sink device gate when its channel is using the line voltage regulation loop to set its current is preferably slightly less than the maximum output voltages that can be provided by the local current loop amplifiers. This allows the channels that are using local current loop drivers to have gate voltages that can potentially exceed $V_{gate}$. This provision prevents a situation where all gate channels would become jammed at the same value and the maximum circuit would be unable to resolve which channel to switch to next. In that case, a predetermined switching order provision of an algorithm could take over, but the algorithm could end up in an endless cycle of round-robin switching where all gates are at the same maximum value and the line regulator voltage remains too low.

Figure 9:
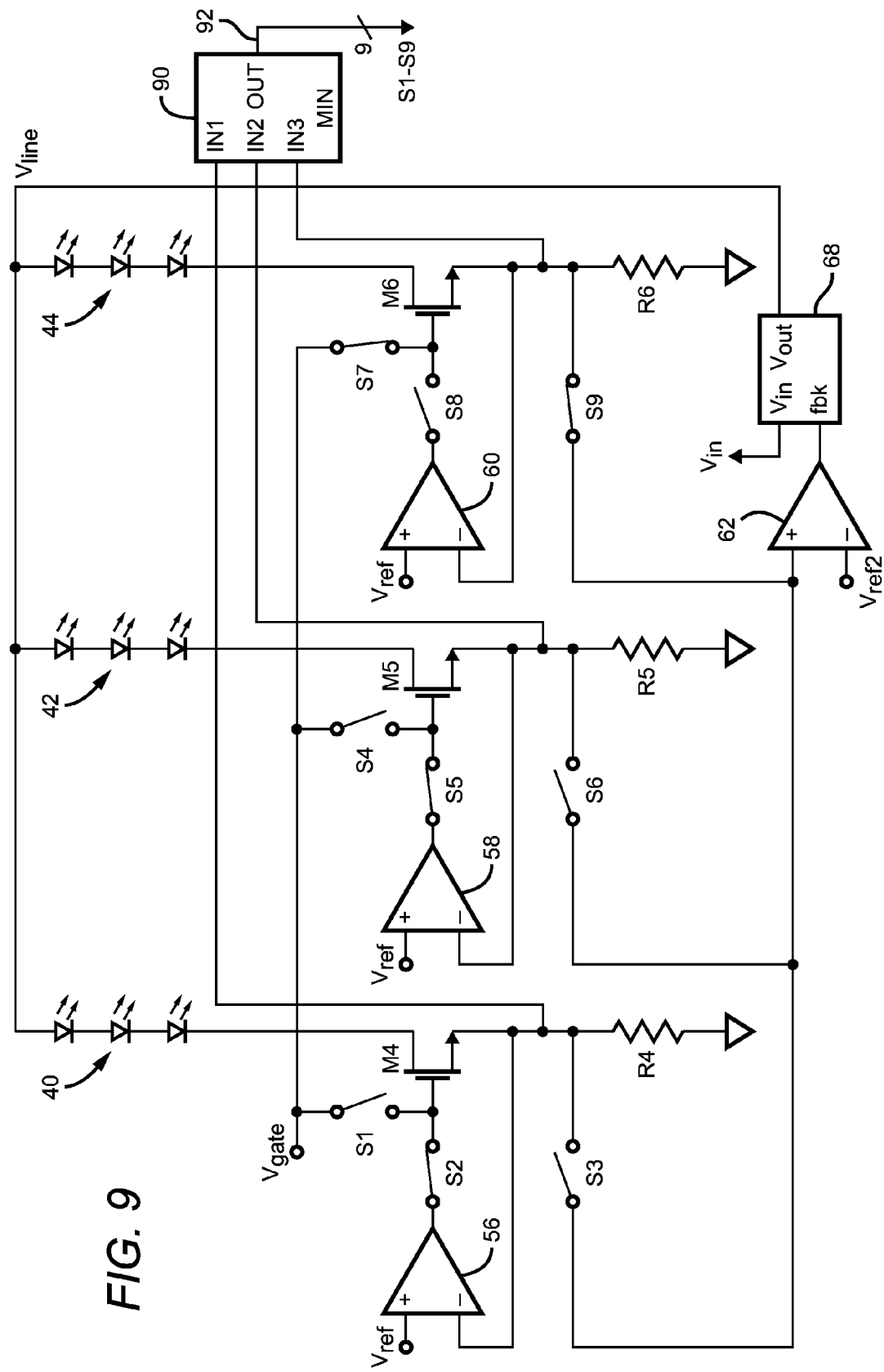
FIG. 9 is a schematic diagram of another possible embodiment of a multi-string LED drive system in accordance with the present invention.

FIG. 9 shows another possible embodiment which uses the minimum sink device source voltage to determine when to reconfigure the channel switches. Similar to the embodiment shown in FIG. 8, the system of FIG. 9 includes a minimum circuit 90 connected to the sources of M4, M5 and M6 at respective inputs, and produces outputs 92 which control the states of switches S1-S9. The system is arranged such that the sources of sink devices M4-M6 are periodically inspected to see which source has the minimum voltage. If the channel using the line voltage regulator loop to set its own current is the channel with minimum source voltage, then no further action is taken. However, if one of the other channels is the channel with the minimum sink device source voltage, then the system reconfigures switches S1-S9 such that the channel with the minimum source voltage becomes the channel to use the line voltage regulator loop to set its current, and the other channels become current-regulated via their own local current loops.

In practice, a system such as that shown in FIG. 9 would typically be arranged such that the source voltages are small in order to minimize waste power consumption. In some cases, the source voltages will only be separated by a few millivolts, making the detection of the minimum source voltage problematic. Amplifiers can be added to provide gain to the source voltages and therefore make the differences between source voltages easier to resolve, but the addition of extra hardware is typically undesirable from a cost point of view. However, assuming the minimum source voltage can be determined, the system will converge to the same point of optimal system power efficiency as the maximum gate voltage method described above. As with the maximum gate voltage method, the system will automatically account for variation in the voltage drops between different LED strings, as well as variation in the characteristics of the sink channel devices.

Figure 10:
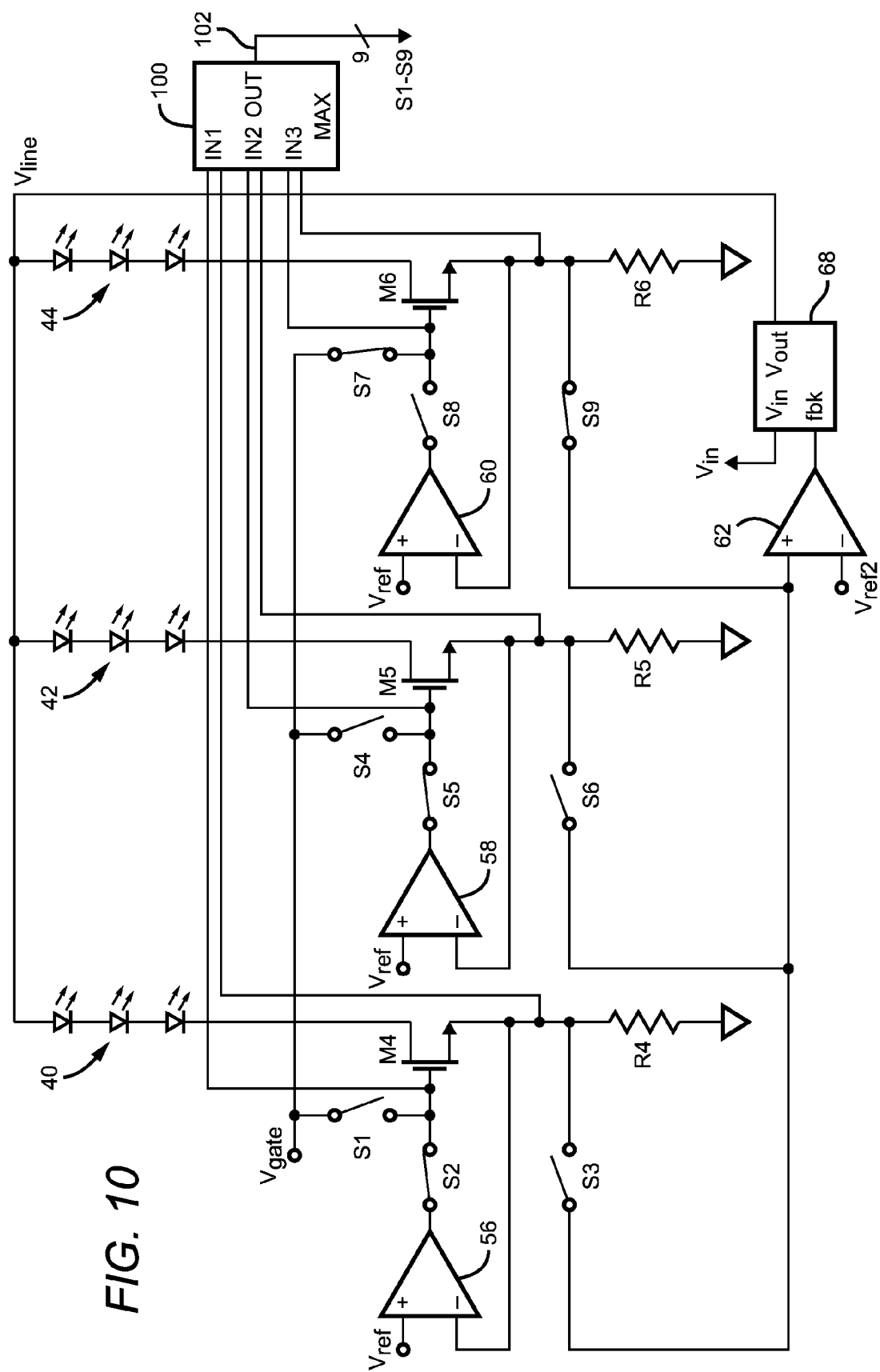
FIG. 10 is a schematic diagram of another possible embodiment of a multi-string LED drive system in accordance with the present invention.

Another possible embodiment, which uses the maximum of the gate-source voltages of the sink devices as the decision criterion, is shown in FIG. 10. A maximum circuit 100 is connected to the gate and source of each sink device (M4, M5 and M6) at respective inputs, and produces outputs 102 which control the states of switches S1-S9. The system is arranged such that the gate-source voltages of sink devices M4-M6 are periodically inspected to see which is the highest. If the channel using the line voltage regulator loop to set its own current is the channel with maximum gate-source voltage, then no further action is taken. However, if one of the other channels is the channel with the maximum sink device gate-source voltage, then the system reconfigures switches S1-S9 such that the channel with the maximum gate-source voltage becomes the channel to use the line voltage regulator loop to set its current, and the other channels become current-regulated via their own local current loops.

As noted above, the gate-source maximum criterion is the most robust since it accounts for any differences between sink devices source voltages, as well between sink device gate voltages. The use of this criterion becomes essential if one chooses to use different local current loop source reference voltages for the individual current loops (e.g., $V_{ref3}$, $V_{ref4}$, and $V_{ref5}$ as shown in FIG. 10). When so arranged, the target voltage ($V_{refx}$) provided to error amplifier 62 is preferably equal to the reference voltage ($V_{ref3}$, $V_{ref4}$, $V_{ref5}$) associated with the selected channel; additional switches (not shown) would be required to realize this arrangement. The gate voltage maximum criteria system of FIG. 8 is guaranteed to converge to power-efficiency optimal only when all sink device source voltages are identical (or nearly identical). As the maximum gate-source voltage criterion illustrated in FIG. 10 produces optimum efficiency under the widest variety of conditions, it is preferred.

Figure 11:
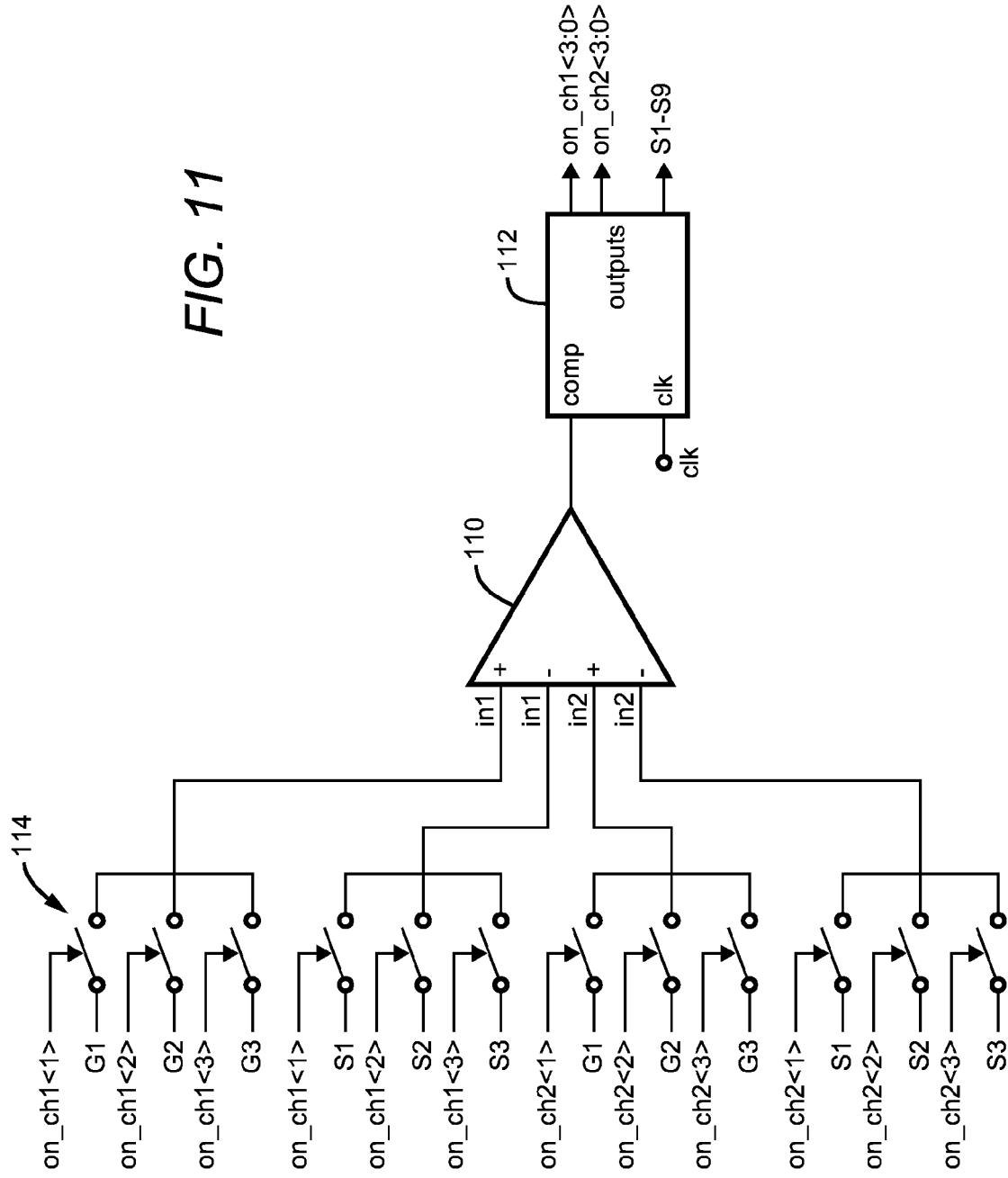
FIG. 11 is a schematic diagram of one possible embodiment of a decision circuit as might be used with a multi-string LED drive system in accordance with the present invention.

The decision circuitry can be implemented in any number of ways. One illustrative embodiment is shown in FIG. 11, which employs the gate-source maximum criteria described in relation to FIG. 10. The circuitry includes a differential comparator (e.g. the comparator has four inputs and outputs logical high or low depending on the whether the difference between two signals is greater than or less than the difference between two other signals) 110 and a block of digital logic 112. The digital logic includes an internal timer along with a state-machine. The internal timer runs off a supplied clock signal CLK. When the timer reaches a certain threshold, the state-machine becomes active. A bank of switches 114 is connected between the sink devices and comparator 110, with half of the switches connected to the sink device gate voltages (G1, G2, G3) and the other half connected to the sink device source voltages (S1, S2, S3). The state-machine configures the switches 114 such that comparator 110 compares the gate-source voltage from the first LED channel to that of the next channel; the results of the comparison identify which channel has the greater gate-source voltage. At the next state of the state-machine, the switches 114 are reconfigured to compare the gate-source voltage from the greater of the two channels of the previous comparison with the next channel. This process continues until the last state of the state-machine, when the channel with the greatest gate-source voltage is identified. At this point, based on the identified channel, the state-machine reconfigures the external switches (S1-S9) to set which LED channel uses the line voltage regulation loop to control its current, and resets the aforementioned internal timer. The state of the external switches preferably remains steady until after the internal timer comparison sequence has repeated.

Figure 12:
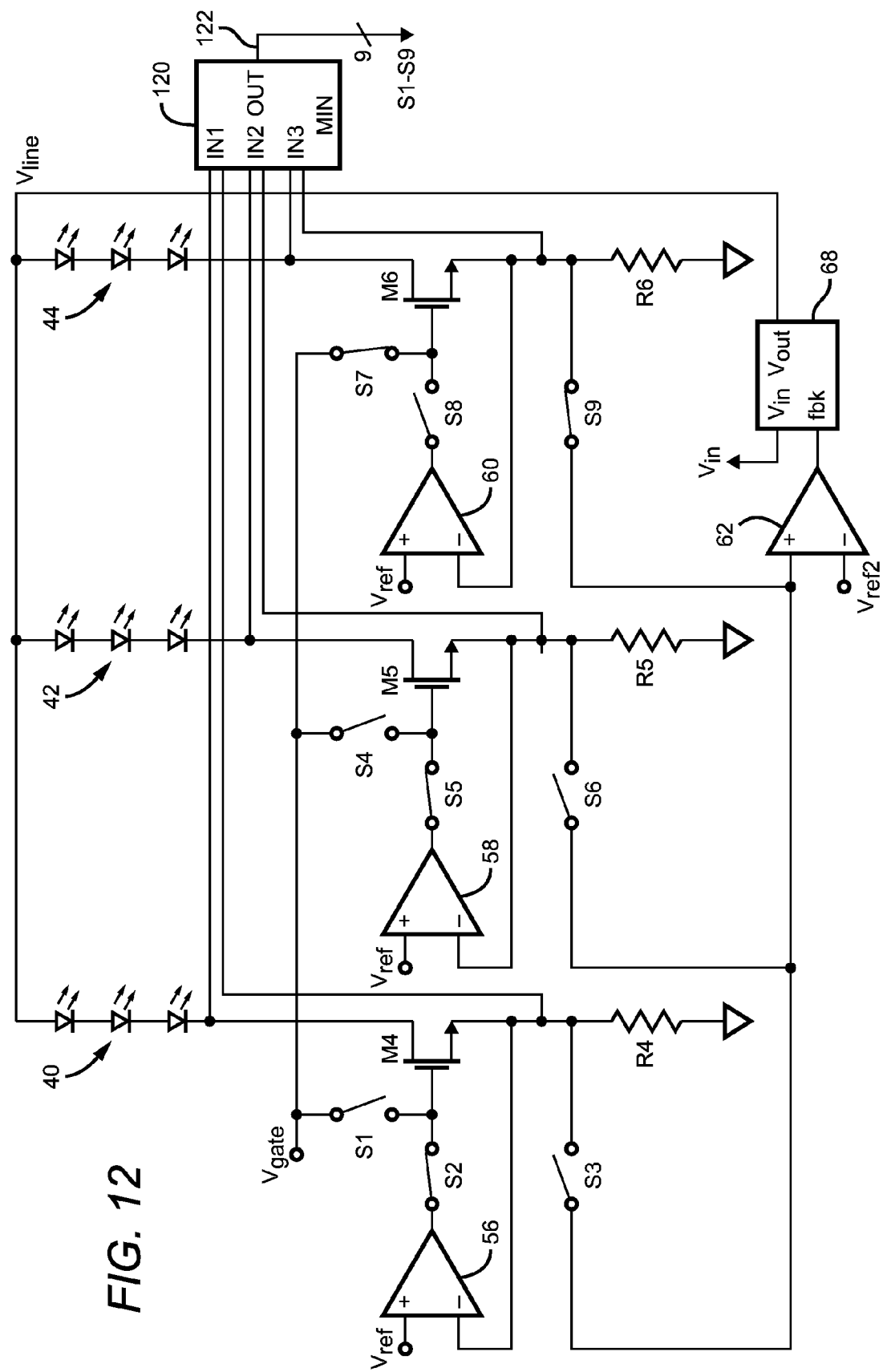
FIG. 12 is a schematic diagram of another possible embodiment of a multi-string LED drive system in accordance with the present invention.

Yet another possible embodiment of the present system, which uses the minimum of the drain-source voltages of the sink devices for the decision switching criterion, is shown in FIG. 12. A minimum circuit 120 is connected to the drain and source of each sink device (M4, M5 and M6) at respective inputs, and produces outputs 122 which control the states of switches S1-S9. The system is arranged such that the drain-source voltages of sink devices M4-M6 are periodically inspected to see which is the lowest. If the channel using the line voltage regulator loop to set its own current is the channel with minimum drain-source voltage, then no further action is taken. However, if one of the other channels is the channel with the minimum sink device drain-source voltage, then the system reconfigures switches S1-S9 such that the channel with the minimum drain-source voltage becomes the channel to use the line voltage regulator loop to set its current, and the other channels become current-regulated via their own local current loops. Note that a drawback of using this criterion is that the system will be able to converge to power efficiency optimal in the presence of LED string voltage imbalances, but may converge off optimal for cases where the sink devices have mismatched characteristics.

Note that, though the embodiments shown make use of amplifiers, in practice the control elements need not be strictly amplifiers. Other possibilities include but are not limited to switched capacitor circuits, digital processing circuits (aided by analog-to-digital and/or digital-to-analog converters), charge pump integrators, etc.

Also note that though the current sink devices are shown as NMOS transistors, other types of sink devices might also be utilized. Candidates include but are not limited to bipolar transistors, junction field effect transistors, insulated gate bipolar transistors, vacuum tubes, etc. It follows that if the sink devices are, for example, bipolar transistors instead of FETs, the present system would monitor for voltages associated with the transistors' base, collector and/or emitter rather than with the gate, drain and/or source, respectively. In addition, though the described and illustrated embodiments employ current sink circuits to conduct the LED string currents, the present system is equally applicable to an arrangement employing current source circuits. Also, the current sensing elements are shown as resistors herein, but other current sensing methods might also be utilized.

The exemplary embodiments show the present system as applied to a series/parallel LED topology; however, the system is equally applicable to a strictly parallel topology. In addition, while the illustrated embodiments show the system operating three LED series/parallel strings, the system works well with as few as two strings and can be expanded to as many strings as necessary.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A multi-string LED drive system for controlling the currents conducted by two or more LED strings which are powered by a common line voltage, said system comprising:
   a plurality of current control circuits connected in series with respective LED strings, at least some of said current control circuits receiving respective reference signals and configured to operate as respective local current loops which regulate the currents conducted by their respective LED strings to values which vary with said received reference signals, wherein each current control circuit includes a current control transistor and an amplifier;
   a switching array operable to select any one of said current control circuits as said selected one of said current control circuits; and
   a line voltage regulation circuit configured to operate as a line voltage regulation loop which receives a maximum gate voltage of current control transistors and a target signal at respective inputs, and is arranged to generate said common line voltage such that said maximum gate voltage of current control transistors is approximately equal to said target signal, said selected one of said current control circuits configured such that the current conducted by the LED string connected to said selected current control circuit is regulated to a value that varies with said target signal by said line voltage regulation loop, wherein for each of said current control circuits, said switching array comprises:
   a first switch which connects the control input of said transistor to a fixed voltage when closed thereby driving said transistor to fixed voltage;
   a second switch which connects the output of said amplifier to the control input of said transistor when closed; and
   a third switch which connects said junction to said line voltage regulation circuit when closed;

such that said first and third switches are open and said second switch is closed when said current control circuit regulates its LED string current with a local current loop, and such that said first and third switches are closed and said second switch is open when said current control circuit operates as said selected current control circuit and therefore regulates its LED string current with said line voltage regulation loop.

2. The LED drive system of claim 1, further comprising:
a decision circuit arranged to operate said switching array to select said selected one of said current control circuits based on predetermined criteria associated with signals derived from said system.

3. The LED drive system of claim 2, wherein each current control transistor is arranged to conduct said current control circuit's LED string current.

4. The LED drive system of claim 3, wherein said selected one of said current control circuits is arranged such that said transistor is driven with a fixed voltage.

5. The LED drive system of claim 3, wherein said current control circuit transistors are FETs.

6. The LED drive system of claim 5, said decision circuit arranged to periodically compare the gate voltages of said FETs and to operate said switching array such that the current control circuit having the FET with the greatest gate voltage is selected as said selected one of said current control circuits.

7. The LED drive system of claim 5, said decision circuit arranged to periodically compare the source voltages of said FETs and to operate said switching array such that the current control circuit having the FET with the smallest source voltage is selected as said selected one of said current control circuits.

8. The LED drive system of claim 5, said decision circuit arranged to periodically compare the gate-source voltages of said FETs and to operate said switching array such that the current control circuit having the FET with the greatest gate-source voltage is selected as said selected one of said current control circuits.

9. The LED drive system of claim 5, said decision circuit arranged to periodically compare the drain-source voltages of said FETs and to operate said switching array such that the current control circuit having the FET with the smallest drain-source voltage is selected as said selected one of said current control circuits.

10. The LED drive system of claim 3, wherein each of said current control circuits comprises:
a resistance connected between said transistor and a circuit common point; and
said amplifier arranged to receive said reference signal at a first input and the voltage at the junction of said resistance and said transistor at a second input;
said current control circuit arranged such that, when the output of said amplifier is connected to drive said transistor, said amplifier and transistor form a local current loop arranged to provide a voltage to said transistor's control input needed to force the voltage at said junction to be approximately equal to the voltage of said reference signal and to simultaneously force the current through said transistor to be proportional to said reference signal.

11. The LED drive system of claim 10, wherein said input signal derived from within a selected one of said current control circuits is the voltage at said selected current control circuit's junction of said resistance and said transistor.

12. The LED drive system of claim 10, wherein said selected one of said current control circuits is arranged such that its transistor is driven with a fixed voltage and said amplifiers have an associated maximum output voltage which they can provide, said system arranged such that said fixed voltage is less than said maximum output voltage.

13. The LED drive system of claim 1, wherein at least one of said LED strings comprises one or more LEDs connected in series.

14. The LED drive system of claim 1, wherein said line voltage regulator circuit comprises:
an error amplifier which provides an output which varies with the difference between said input signal derived from within a selected one of said current control circuits and said target signal; and
a voltage regulator which provides an output voltage that varies with the signal received at a control input, said control input coupled to the output of said error amplifier such that said voltage regulator varies its output voltage until said input signal derived from within a selected one of said current control circuits and said target signal are approximately equal, said voltage regulator's output voltage being said common line voltage.

15. The LED drive system of claim 1, wherein parameter signals are associated with each of said current control circuits, further comprising:
a first switching array operable to select any one of said current control circuits as said selected one of said current control circuits; and
a decision circuit arranged to operate said first switching array to select said selected one of said current control circuits based on the results of comparisons performed between the parameter signals associated with said current control circuits, said decision circuit comprising:
a comparator;
a second switching array arranged to connect said current control circuits' parameter signals to said comparator; and
a logic block connected to the output of said comparator and arranged to operate said second switching array as needed to effect the comparisons between said parameter signals, and to operate said first switching array to select said selected one of said current control circuits.

16. A multi-string LED drive system for controlling the currents conducted by two or more LED strings which are powered by a common line voltage, said system comprising:
a plurality of current control circuits connected in series with respective LED strings, each of said current control circuits comprising:
a FET arranged to conduct said current control circuit's LED string current;
a resistance connected between said FET and a circuit common point; and
an amplifier which receives a reference voltage at a first input and the voltage at the junction of said resistance and said FET at a second input;
said current control circuit arranged such that, when the output of said amplifier is connected to the gate of said FET, said amplifier and FET form a local current loop arranged to provide a voltage to said FET's gate needed to force the voltage at said junction to be approximately equal to said reference voltage, thereby regulating the current conducted by said current control circuit's LED string to a value which varies with said reference voltage;
a line voltage regulation circuit configured to operate as a line voltage regulation loop, which receives a maximum gate voltage of the FETs and is arranged to generate said common line voltage such that said maximum gate voltage of the FETs is approximately equal to a target signal, such that the current conducted by the LED string connected to said selected current control circuit is regulated to a value that varies with said target signal by said line voltage regulation loop;

a switching array operable to select any one of said current control circuits as said selected one of said current control circuits; and a decision circuit arranged to operate said switching array to identify said selected one of said current control circuits based on predetermined criteria, wherein for each of said current control circuits, said switching array comprises:

a first switch which connects the control input of said FET to a fixed voltage when closed thereby driving said transistor to fixed voltage;

a second switch which connects the output of said amplifier to the control input of said FET when closed; and a third switch which connects said junction to said line voltage regulation circuit when closed;

such that said first and third switches are open and said second switch is closed when said current control circuits regulate its LED string current with a local current loop, and such that said first and third switches are closed and said second switch is open when said current control circuits operate as said selected current control circuit and therefore regulates its LED string current with said line voltage regulation loop.

17. The LED drive system of claim 16, said decision circuit arranged to periodically perform comparisons between parameter signals associated with each of said FETs so as to determine which current control circuit meets said predetermined criteria, said predetermined criteria chosen from a group comprising maximum gate voltage, minimum source voltage, minimum drain voltage, maximum gate-source voltage or minimum drain-source voltage, and to operate said switching array to select said selected one of said current control circuits based on the results of said comparisons.

18. A multi-string LED drive system for controlling the currents conducted by two or more LED strings which are powered by a common line voltage, said system comprising:

a plurality of current control circuits connected in series with respective LED strings, each of said current control circuits including an amplifier and a field effect or bipolar transistor arranged to cause a desired LED string current to be conducted when a sufficient voltage is applied to said transistor's gate or base;

a maximum circuit which receives the gate-source or base-emitter voltages for each of said transistors at respective inputs and which outputs a voltage which is proportional to the greatest of said received gate-source or base-emitter voltages;

a line voltage regulator circuit which receives the output of said maximum circuit and a signal which represents a target gate-source or base-emitter voltage at respective inputs and which generates said common line voltage such that the highest of said gate-source or base-emitter voltages is approximately equal to said target voltage; and further including, for each current control circuit;

a first switch which connects the control input of said transistor to a fixed voltage when closed thereby driving said transistor to fixed voltage;

a second switch which connects the output of said amplifier to the control input of said transistor when closed; and a third switch which connects said junction to said line voltage regulator circuit when closed;

such that said first and third switches are pen and said second switch is closed when said current control circuit regulates its LED string current with a local current loop, and such that said first and third switches are closed and said second switch is open when said current control circuit operates as said selected current control circuit and therefore regulates its LED string current with said line voltage regulator circuit.

* * * * *